April 27, 1926.
J. W. PARKER
1,582,078
GEAR SHIFTING MECHANISM
Filed June 25, 1923     4 Sheets-Sheet 1
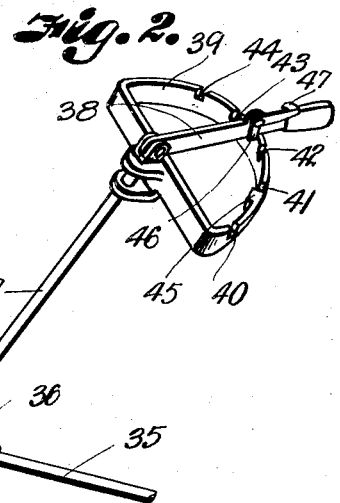
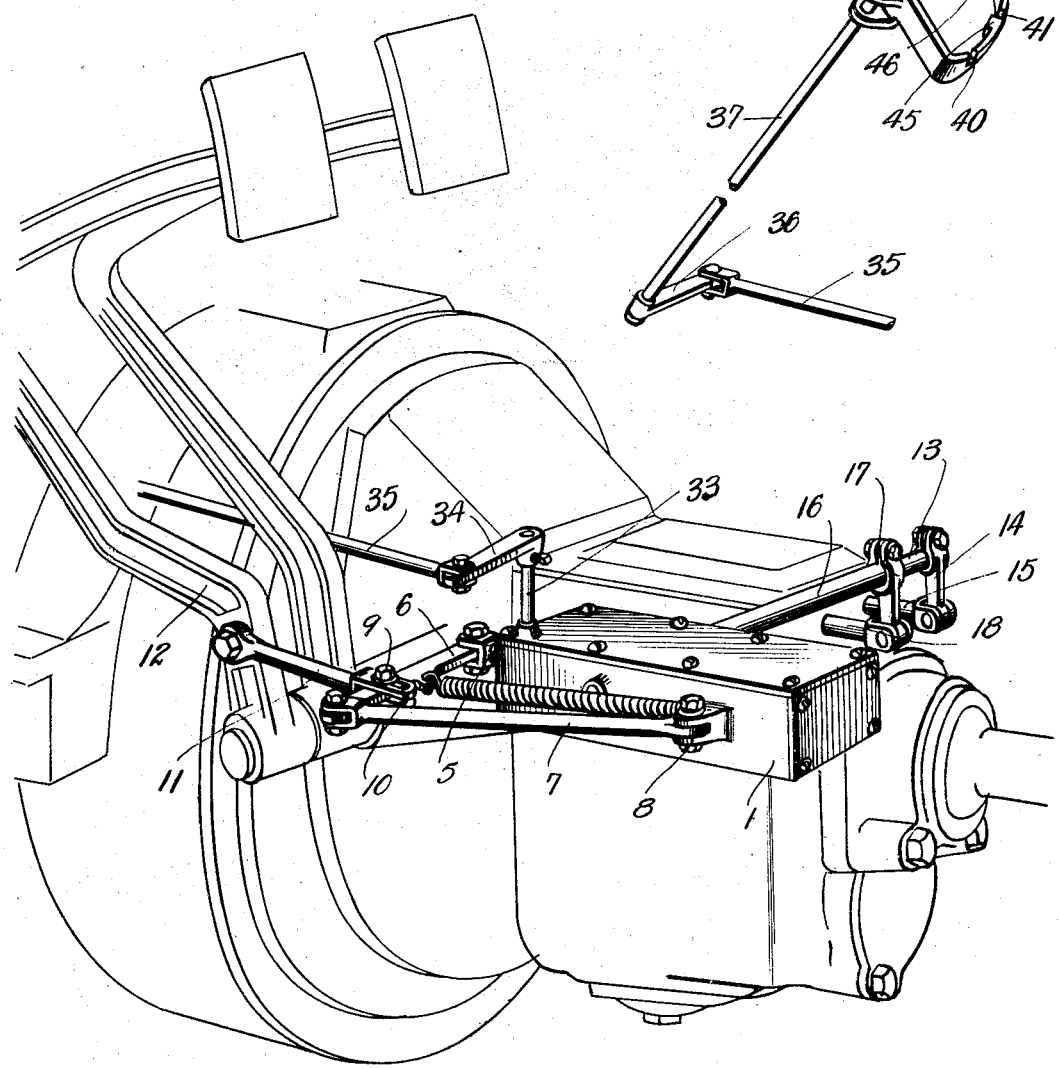
INVENTOR
James W. Parker.
BY Arthur C. Brown
ATTORNEY April 27, 1926.  
J. W. PARKER  
GEAR SHIFTING MECHANISM  
Filed June 25, 1923 4 Sheets-Sheet 2

1,582,078

INVENTOR  
James W. Parker  
BY Arthur E. Bram  
ATTORNEY

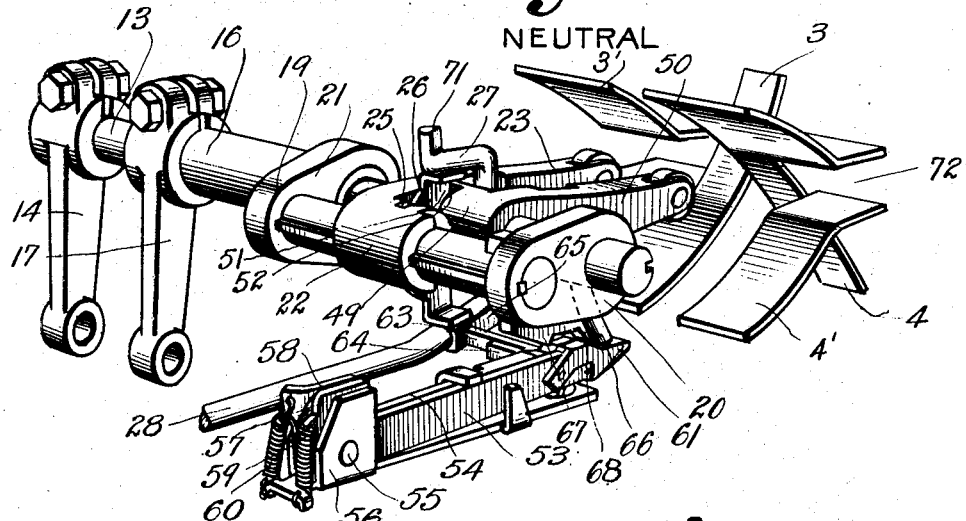

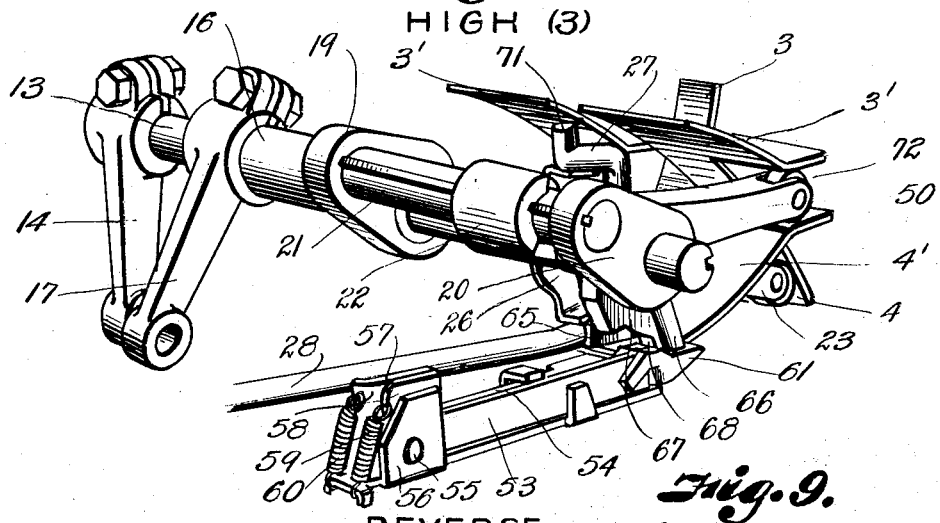
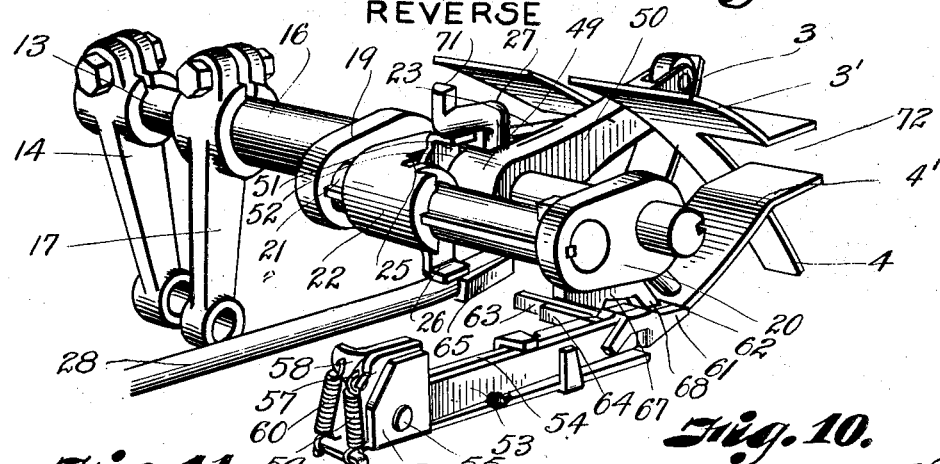
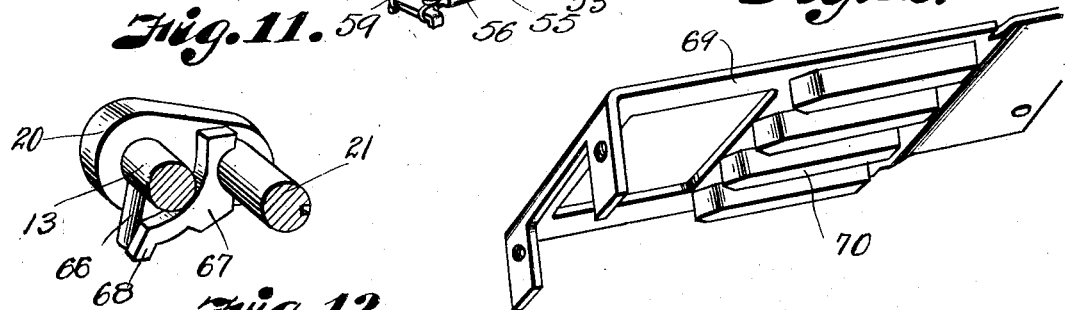
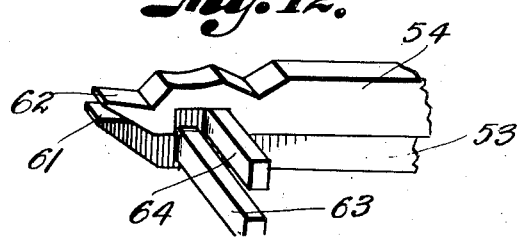

Patented Apr. 27, 1926.

1,582,078

UNITED STATES PATENT OFFICE.

JAMES W. PARKER, OF WINDSOR, MISSOURI.

GEAR-SHIFTING MECHANISM.

Application filed June 25, 1923. Serial No. 647,554.

*To all whom it may concern:*

Be it known that I, JAMES W. PARKER, a citizen of the United States, residing at Windsor, in the county of Henry and State of Missouri, have invented certain new and useful Improvements in Gear-Shifting Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a gear shifting mechanism for motor vehicles.

The primary object of the invention is to provide a simple, conveniently operated gear shifting mechanism for operating the shift bars of the change speed gear mechanism to conveniently step the gears for different positions, such as neutral, reverse, low, intermediate and high and the invention contemplates mechanism by means of which the shifting of the gears may be accomplished by a pedal in contra-distinction to the ordinary gear shift lever.

I have so constructed the gear shift mechanism that it may be associated with the clutch lever and means is provided whereby a clutch releasing movement of the clutch pedal must take place before the gear shift operating mechanism is rendered effective. In this way it will be necessary each time to throw out the clutch before the gear shift operates. Consequently, liability of the gears clashing due to attempts to change the speed through the transmission while the clutch is in will be wholly eliminated.

The gear shifting mechanism can be set by a control lever adapted to be conveniently located adjacent to the steering wheel so that the gear shift operating mechanism can be initially set for progressive steps which will automatically follow if the control lever is properly adjusted. For example, the control lever can be so positioned that by successive movements of the pedal of the clutch, the gears will be adjusted from the initial position, such as neutral, to low, then to intermediate and from intermediate to high, or the lever can be set so that by operating the clutch pedal the gears will be shifted into low and be held against shifting into intermediate or high, the control lever can be set so that the gears can shift from neutral into low and from low into intermediate but not into high, or it can be set so that the operation of the clutch pedal will cause the shifting through the gears from neutral into high or from neutral to reverse and in coming back through the gears, the lever can be set so that by operating the clutch pedal the operator can shift from high into low, from high into reverse, or immediately back into neutral. Therefore, by setting the lever adjacent to the steering wheel or at any other convenient point on the vehicle where it may be located, no further use of the hands of the operator is required because the shifting can be accomplished by operating the pedal.

There is another important feature of the invention and it resides in the fact that the gear shift mechanism may be set to progressively step up from low to intermediate or high and then it may be set to drop back to either intermediate or low by working the clutch pedal but the clutch pedal will not necessarily cause an operation of the shifting mechanism when it is released because there is enough lost motion to release the clutch pedal repeatedly without causing shifting of the gears. In other words, the throwing-out of the clutch does not necessarily cause operation of the gear shift because a fractional movement of the pedal will not affect the gear shift. The gear shift will only operate after the pedal has moved far enough to throw out the clutch and then when it has an additional movement imparted to it.

All of this will be clear by reference to the following description in connection with the accompanying drawings, in which Fig. 1 is a perspective view of a clutch housing and transmission housing to which my invention is applied.

Fig. 2 is a detail, perspective view of the gear shift setting lever.

Fig. 5 is a perspective view of the gear shift operating parts set for neutral position of the gears, ready to be shifted into low, Fig. 6 is a similar view with the parts set for low position of the gears.

Fig. 7 is a like view with the parts set for intermediate position of the gears.

Fig. 8 is a view of the parts set for high.

Fig. 9 is a perspective view of the parts set for reverse.

Fig. 10 is a perspective view of the selector guide plate.

Fig. 11 is a detail, perspective view of the dog actuating pawl, and

Fig. 12 is a fragmentary, perspective view of two stop dogs.

Figure 3:
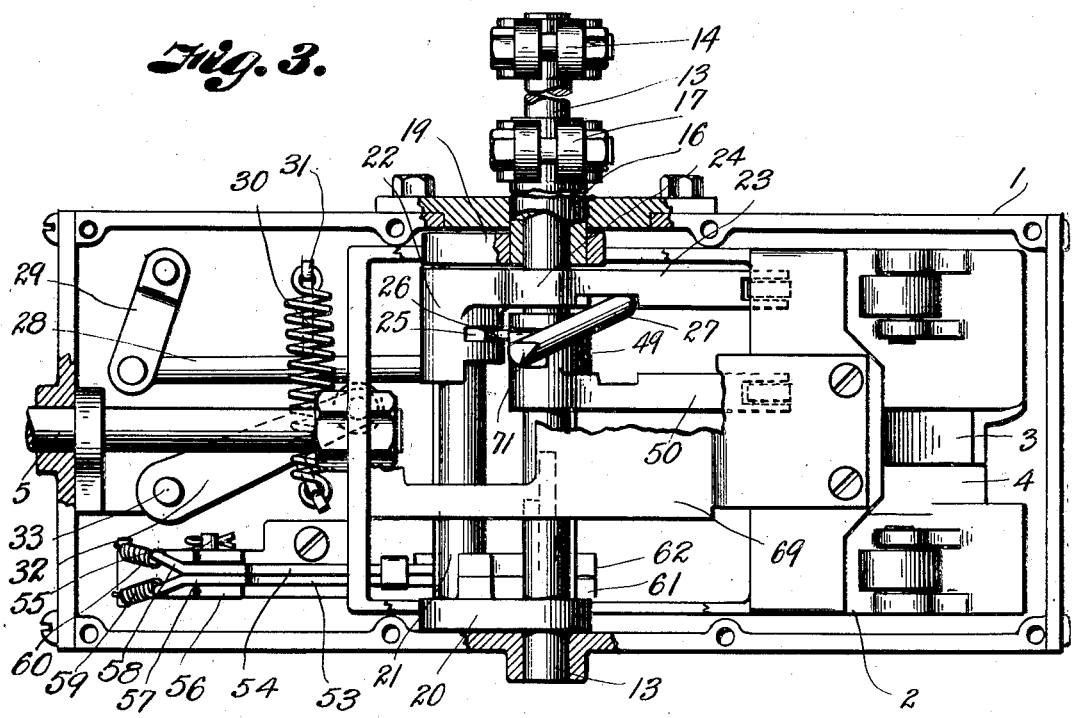
Fig. 3 is a plan view of the gear shift controlling mechanism.
Figure 4:
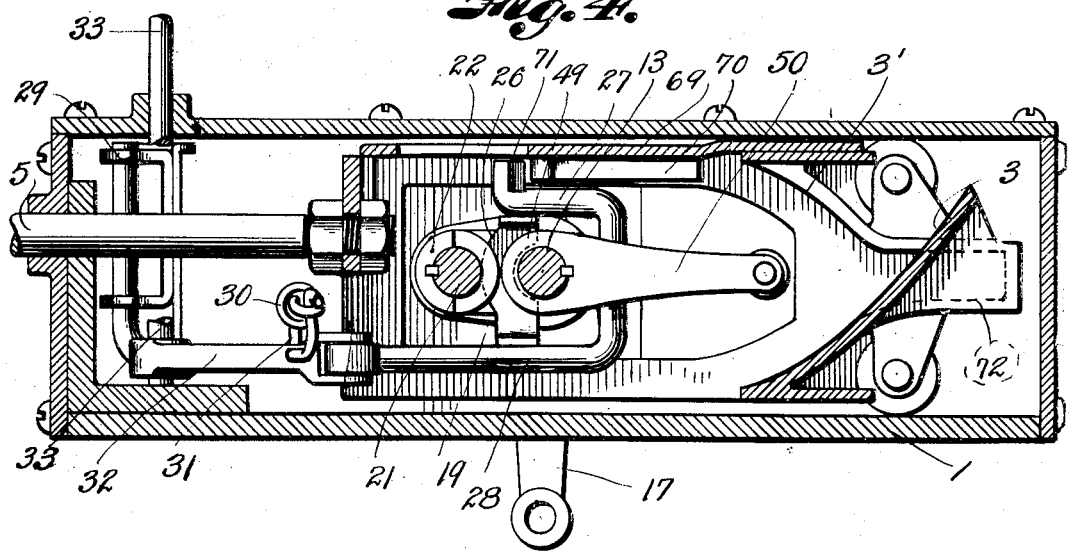
Fig. 4 is a side elevational view of the mechanism with the side of the case removed, parts being shown in section.

The operating mechanism of the device is adapted to be enclosed in a casing such, for example, as the rectangular casing 1, which may be suitably supported on the chassis of the motor vehicle. I have shown the device as designed for a standard gear shift but, obviously, the generic embodiment of the invention is capable of being incorporated in any other form of gear shift so while I will describe the operations as applied to what is at present known as a standard gear shift, I do not wish to be limited to the application of the device to such a gear shift.

Slidably mounted in the casing is a cam slide or actuator 2, which carries cams 3 and 4 adapted to contact with gear shift shaft throw arms which will be presently described. The cam slide is in the form of a rectangular skeleton frame and it has an actuating rod 5 at the end opposite to that at which the cams are located. The actuating rod or stem is pivotally connected to one end of a link 6 and the other end of the link 6 is pivotally connected to a stay bar 7, in turn pivoted to the side of the case 1 at 8. The link 6 carries a headed stud or pin 9 engaged by the elongated slotted portion 10 of a connecting rod or link 11, which is fastened to the clutch pedal 12. The elongated slot 10 permits lost motion between the link or connecting rod 10 and the link 6 so that when the clutch pedal is initially moved to throw out the clutch, the clutch will go out before the end of the slot is reached. Therefore, the cam slide will not be actuated while the clutch is in. This is an important feature because by providing the means for effecting the initial movement of the clutch pedal, liability of the gears clashing, due to the fact that they start to shift while the clutch is in, will be eliminated.

Mounted transversely in the casing 1 is a shaft 13 which carries at its outer end a crank 14 connected to the shift bar 15 which operates the low and reverse gears in the standard gear shift.

Sleeved upon the shaft 13 is a hollow shaft 16 which projects through one side of the case 1 and carries on its outer end a crank 17, which is connected to the sliding bar 18 which operates the high and intermediate shift gears of the transmission.

There must of necessity be independent rocking movements of the shafts 13 and 16 so I have provided the shaft 16 with cranks 19 and 20 connected by a key shaft 21 slidably keyed in the head or collar 22 of the throw arm 23 which is provided with a bearing 24 slidably mounted on the shaft 13 but adapted to rock thereon so that the shaft 16 can rock independently of the shaft 13 when the throw arm 23 engages either cam 3 or 4 so as to swing the arm 17 in either of two directions to throw the gears into either high or intermediate. The hub or collar 22 is provided with a notch or slot 25, which is engaged by a fin 26 on the yoke 27 of the transverse swinging shifter lever 28 so that when the shifter lever is moved back and forth, the throw lever 23 will be shifted on the shafts 13 and 21 to bring it either into or out of line with the cams 3 and 4. The transverse swinging shifter lever or arm 28 is pivoted to a hinge member 29 carried by the case and the shift lever is normally urged in one position by a spring 30, one end of which is fastened to the shift lever 28 through the medium of a pin 31, the other end being fastened to the crank 32 on the end of the vertical rock shaft 33, projecting through the top of the case and having a crank 34 to which is connected a link 35, in turn connected to a crank 36 on the vertical rock shaft 37, which preferably extends to a point adjacent to the steering wheel and which has an operating hand lever 38 movable over the segmental rack 39. The hand lever 38 is adapted to be dropped into any one of a plurality of notches in the segmental rack. For example, the notch 40 is for neutral position, the notch 41 is for reverse, the notch 42 is for low, the notch 43 is for intermediate and the notch 44 is for high. Therefore, as will be presently explained, the driver can set the hand lever 38 in the proper notch to insure the proper shifting of the gears through the clutch pedal 12.

It is well to state here that means is provided for preventing the lever 38 from being accidentally dropped into the reverse notch during the time that the car is being driven. In order to prevent this I have provided on the inside of the rack 39 a shoulder 45, over which will normally ride a dog 46 on the lever 47. Therefore, the lever 38 may move back and forth over the rack and past the notch 41 so that each time the dog will ride over the shoulder 48 and prevent the lever from dropping into the reverse notch 41. If, however, the operator wishes to deliberately go into the notch 41, he will press down on the free end of the lever 47 to throw the dog away from the shoulder 45. Then the lever 38 can drop into the notch 41. Therefore, it will be seen that liability of accidentally going into reverse will be entirely eliminated.

Referring now to the shift lever 28 it will be seen that the yoke 27 of the shift lever 28 also engages the hub 49 of the throw lever or arm 50, which is independently mounted to rock with the shaft 13 since it is keyed on the shaft 13 to rotate therewith so that it may slide on shaft 13. The yoke is provided with a fin 51 which engages a slot 52 in the hub 49 so that when the shift lever 28 is moved, the hub 49 with its arm 50 will be moved laterally of the frame 1 simultaneously with the hub 24 of the arm 23 so that both arms 23 and 50 will be shifted laterally together but each arm can move about its shaft independently of the other arm.

Means is provided for causing the throw levers 23 and 50 to step by step progressively move from one side of the frame to the other and across the cam by operating the clutch pedal 12. The mechanism for controlling the movement is shown as consisting of two pivoted bars or dogs 53 and 54, mounted at the far side of the frame 1. The dogs 53 and 54 are mounted on a pivot 55 in a bracket 56 and they have projecting fingers 57 and 58 to which the upper ends of the springs 59 and 60 are secured, the lower ends of the springs being fastened to the frame so that there will normally be a tendency to raise the front end or toes 61 and 62 of the bars or dogs 53 and 54 upwardly. The toes of the bars 53 and 54 carry right angularly projecting stop fingers 63 and 64 (see Fig. 12,) which are adapted to obstruct the lateral movement of the shifting lever 28 but which will permit the shifting lever to move progressively across the frame.

The shifting lever is provided with a stop-engaging member or face 65 which may contact with the end of either the finger 63 or 64 and the bars or dogs 53 and 54 can be moved about their pivot 56 out of shifting bar obstructing position by release devices. For example, on the crank 20 is a pin 66 which may contact with the toe of the bar 53 to move the long stop 63 out of engagement with the face 65. On the shaft 21 is a rigid dog 67 having a toe 68 which may engage the toe 62 of the bar or dog 54 so as to depress it to throw the stop finger 64 below the contacting face 65 of the throw arm or lever 28, the pin 66 and the dog 67 being brought into toe-depressing position by the passage of the ends of the arms 23 and 50 over the cams 3 and 4 so that as the throw arms 23 and 50 move from one side of the case to the other and swing about the axis of their shafts, the dogs or arms 53 and 54 will be progressively depressed to move the stops 63 and 64 out of obstructing position to permit a progressive movement of the arms 23 and 50 from one side of the frame to the other to permit the arms 23 and 50 to align with the cams 3 and 4 to effect the rotation of the shafts 13 and 16 to swing the cranks 14 and 17 so that the gears in the transmission can be shifted. The arms 23 and 50 are shifted transversely by energy stored up in the spring 30 when the crank arm 32 is swung about the axis of the vertical shaft 33 and it is to be here noted that the extent of the transverse shifting of the two arms 23 and 50 will be determined by the position of the end of the crank 32 and the position of the end of the crank 32 will be determined by the position of the lever 38 with respect to the segment.

If the lever 38 is in notch 40, there will be no shifting of the arms 23 and 50 from neutral position so the clutch 12 can be moved back and forth without shifting any of the gears but if the lever 38 is in the notch 42, the shifting of the arms 23 and 50 can be only to the extent of one step because the end of the crank 32 will have moved only slightly in one direction and energy will be stored up in the spring 30 to cause the shifting arm 28 to move only part of the way across the frame. If, however, the arm 38 is moved to the notch 44, then the maximum energy will be stored in the spring 30 and the end of the crank arm 32 will be moved to its fullest extent toward one side of the case 1 so that the spring 30 will urge the shifter arm 28 entirely across the frame or case 1 but while there is energy stored in the spring 30 to move the shifter arm 28 across the frame, when the clutch pedal is moved the first time, the lower cam frame will cause the arm 50 to ride up the cam 3 to throw the arm 14 in one direction to shift the gears from neutral into low.

When the arm 28 swings over to its first position, the face 65 will contact with the end of the finger 63. The spring 30 still has energy stored up in it, however, tending to urge the arms 27 and 50 over to the next position, or intermediate. Therefore, when the clutch pedal is moved again, the finger 66 will be pressed against the dog 53 so that the stop 63 will be moved out of engagement with the face 65 and the actuator arm 28 can swing the hubs of the arms 27 and 50 to the next position so that the face 65 will then contact with 64, when the arms will be in the position shown in Fig. 7 and thereby cause shifting of the gears to intermediate position when a longitudinal movement is imparted to the cam slide 2 through the clutch pedal.

There still being energy stored up in the spring 30, the next movement will permit the member 28 to swing entirely over so that the parts will be in the position shown in Fig. 8 for high. When the parts are in the position shown in Fig. 9, they will throw in the reverse gear.

The frame carries a selector plate 69 with longitudinal guides 70 thereon which are adapted to be engaged by the selector tooth 71 on the yoke-shaped end of the shifter bar 28 so that when the lever 38 is moved into any one notch through its connections, it will be effective in moving the tooth 71 in line with the particular selector slot between the guides 70 to effect the proper operation.

The positions of the parts for the various positions of the transmission gears will be better understood by referring to Figs. 5, 6, 7, 8 and 9, which illustrate the positions of the various parts for neutral, low, intermediate, high and reverse in the order named and it will be apparent that the mechanism can be conveniently controlled from a point adjacent to the steering wheel or at any other convenient point within easy reach of the operator. I consider it of no small importance that the hand lever 38 can be so set that the operation of the clutch pedal will effect whatever movement of the gear shift mechanism is intended by the position of the hand lever 38, the hand lever 38 being effective in permitting shifting from neutral into low only, or for causing automatic progressions from neutral, low, intermediate and high or from neutral through low into intermediate and in fact, any change desired and it is of no small importance that if the gears are in high, the operator can shift the hand lever 38 into the notch 43, for example, and let it remain there. Then the clutch pedal can be thrown in and out as many times as desired without changing the changed speed gears unless the clutch pedal is moved to its fullest extent or beyond the limit allowed by the lost motion connection consisting of the slot 10. If the clutch pedal is moved only enough to throw out the clutch in any position of the gears, the shifting of the gears will not be effected but if the clutch pedal is moved far enough to take up the lost motion connection and then exert pressure on the link 6, there will be a changed gear operation. The linkage consisting of the members 5, 6, 7, 8, 9, 10 and 11 is so proportioned that very little power will be required to effect the operation of the cam slide but I do not wish to be limited to the exact arrangement shown. Indeed, I reserve the right to make whatever changes in form, proportion and minor details advisable to adapt the generic principle of my invention to different forms of gear shifts and while I have shown it particularly designed for the so-called standard gear shift; that is, a gear shift common to cars of this period, 1 do not wish to be limited to the application to a standard gear shift alone.

As heretofore explained, the cams 3 and 4 are the positive actuating cams for the rocker arms 23 and 50. There are cams 3′ and 4′ which are restoring cams in that they restore the arms to their normal positions, after they have been actuated by the cams 3 and 4. For example, when the arms ride down the cam 3′ and up the cam 4′, they will be shifted to a horizontal position and when the arms are between the cams, that is, out of line with the cams 3 and 4, they are in neutral position. This is shown in Fig. 5. In other words, unless the cams 3 and 4 or 3′ and 4′ are in alignment with the ends of the arms, it is obvious that when the cam carrier is shifted, the arms will pass through the spaces between the sets of cams so that there can be no actuation of the arms but whenever the arms are shifted to align with any of the active cams, the rock shafts will be rocked.

It is to be here noted too that when the arm 50 is riding down the cam 4, the arm 23 will move through the space between the cam 3 and the cam 3′ so that the crank 17 will not be actuated. This is for the low position. When, however, the arms are shifted over to intermediate position with the arm 23 riding up the cam 3, then the end of the arm will move through the space 72 between the cams 4 and 4′. This is the intermediate position (see Fig. 7). When the arm 23 is riding down the cam 4, the arm 50 will still pass through the space 72. This is the high position, but when the arm 50 is riding up the cam 3, the arm 23 will be riding down the cam 3′ to throw the gears previously in mesh out of mesh and allow the reverse gears to be in mesh.

The relative positions of the parts are elaborately illustrated in Figs. 5, 6, 7, 8 and 9 so that the relative positions of the various members of the mechanism can be readily followed.

What I claim and desire to secure by Letters-Patent is:

1. In a gear shift for motor vehicles, a plurality of rock shafts, means on the rock shafts for actuating the shift rods for the transmission gear set of the motor vehicle, arms on the rock shafts, a slidable cam carrier having cams to independently engage the arms to rock the rock shafts, the cams being arranged across the cam carrier, and means for sliding the arms longitudinally of the rock shafts to bring them into and out of alignment with the cams.

2. In a gear shift for motor vehicles, a plurality of rock shafts, means on the rock shafts for actuating the shift rods for the transmission gear set of the motor vehicle, arms on the rock shafts, a slidable cam carrier having cams to independently engage the arms to rock the rock shafts, the cams being arranged across the cam carrier, means for sliding the arms longitudinally of the rock shafts to bring them into and out of alignment with the cams, a selector plate, and a selector finger movable with the arms to engage grooves in the selector plate.

3. In a gear shift for motor vehicles, a plurality of rock shafts, transverse arms shiftable longitudinally of the rock shafts but held against rotative movement with respect to said rock shafts, means for simultaneously shifting said arms, and a cam carrier for independently actuating said arms to rotate the rock shafts, the rock shafts being capable of connection to the shift rods of the transmission gear set.

4. In a gear shift for motor vehicles, a frame, rock shafts mounted in said frame, arms mounted for non-rotative movement with respect to the rock shafts but slidable thereon, means for urging the arms to one side of the frame, an escapement mechanism permitting progressive advancement of the arms along the rock shafts, and operating cams with which the arms are adapted to align in their progressive movement.

5. In a gear shift for motor vehicles, a plurality of rock shafts, actuating arms on the rock shafts having sliding movement longitudinally of the rock shafts, means for normally urging the arms along the rock shafts in one direction, an escapement mechanism for permitting step by step progressive movement of the arms in one direction, and means for independently operating the arms to rock the rock shafts.

6. In a gear shift for motor vehicles, a plurality of rock shafts, actuating arms on the rock shafts having sliding movement longitudinally of the rock shafts, means for normally urging the arms along the rock shafts in one direction, an escapement mechanism for permitting step by step progressive movement of the arms in one direction, means for independently operating the arms to rock the rock shafts, and cranks on the rock shafts for connection to the shift rods of the transmission gear set.

7. In a gear shift for motor vehicles, a frame, a plurality of concentric rock shafts mounted in the frame, cranks on the rock shafts for operating the shift rods of the transmission gear set, rocker arms slidable in the shafts, cams for independently actuating the rocker arms, means for connection to the clutch pedal of a motor vehicle for moving said cams into functional position, and means for shifting the arms longitudinally of the rock shafts.

8. In a gear shift for motor vehicles, a frame, a plurality of concentric rock shafts mounted in the frame, cranks on the rock shafts for operating the shift rods of the transmission gear set, rocker arms slidable in the shafts, cams for independently actuating the rocker arms, means for connection to the clutch pedal of the motor vehicle for moving said cams into functional position, means for shifting the arms longitudinally of the rock shafts, and an escapement mechanism for causing the shifting movements of the arms to progress step by step.

9. In a gear shifting mechanism for motor vehicles, a frame, rockable arms in the frame, a tension spring for shifting the arms across the frame, means for variably loading the spring a cam carrier shiftable longitudinally of the frame but held against transverse movement, the cam carrier having movement to rock the arms and gear-shift-mechanism operating means actuated by the arms.

10. In a gear shift for motor vehicles, a plurality of rock shafts, actuating arms on the rock shafts, cranks on the rock shafts, the latter being mounted for connection to the shift rods of a transmission gear set, means for sliding the arms longitudinally on the shafts, a spring normally urging the arms in one direction, and an escapement mechanism for causing a progressive step by step movement of the arms lengthwise of the shafts.

11. In a gear shift for motor vehicles, plurality of rock shafts, actuating arms of the rock shafts, cranks on the rock shafts, the latter being mounted for connection to the shift rods of a transmission gear set, means for sliding the arms longitudinally on the shafts, a spring normally urging the arms in one direction, an escapement mechanism for causing a progressive step by step movement of the arms lengthwise of the shafts, and means for shifting the arms away from the escapement mechanism.

12. In a gear shift for motor vehicles, a plurality of rock shafts, actuating arms on the rock shafts, cranks on the rock shafts, the latter being mounted for connection to the shift rods of a transmission gear set, means for sliding the arms longitudinally on the shafts, a spring normally urging the arms in one direction, an escapement mechanism for causing a progressive step by step movement of the arms lengthwise of the shafts, and means for loading the spring so as to determine the extent of movement of the arms along the shafts in one direction.

13. In a gear shift for motor vehicles, a plurality of rock shafts, actuating arms on the rock shafts, means for shifting the arms longitudinally of the rock shafts, a spring for urging the arms along the rock shafts in one direction, means for variably loading the spring to urge the arms variable distances in one direction, and an escapement mechanism for causing a step by step progressive movement of the arms in the direction in which they are urged.

14. In a gear shift for motor vehicles, a plurality of rock shafts, actuating arms on the rock shafts, means for shifting the arms longitudinally of the rock shafts, a spring for urging the arms along the rock shafts in one direction, means for variably loading the spring to urge the arms variable distances in one direction, an escapement mechanism for causing a step by step progressive movement of the arms in the direction in which they are urged, and a longitudinally slidable cam carrier having fixed cams for engagement with the arms to swing them in arcs to cause the shafts to rock.

In testimony whereof I affix my signature.

JAMES W. PARKER.